US010225252B1

(12) United States Patent
den Boer et al.

(10) Patent No.: US 10,225,252 B1
(45) Date of Patent: Mar. 5, 2019

(54) DYNAMIC WATCH-BASED CAPTCHA

(71) Applicant: Apple Inc., Cupertino, CA (US)

(72) Inventors: David A. den Boer, San Martin, CA (US); Shahid Ahmed, Los Altos Hills, CA (US); Jennifer A. Walton, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/187,333

(22) Filed: Jun. 20, 2016

Related U.S. Application Data

(63) Continuation of application No. 14/681,924, filed on Apr. 8, 2015.

(51) Int. Cl.
*H04L 29/06* (2006.01)
*G06T 11/60* (2006.01)
*G06T 3/60* (2006.01)
*G04G 21/00* (2010.01)

(52) U.S. Cl.
CPC ............ *H04L 63/10* (2013.01); *G04G 21/00* (2013.01); *G06T 3/60* (2013.01); *G06T 11/60* (2013.01); *G06F 2200/1614* (2013.01); *G06F 2221/2103* (2013.01); *G06F 2221/2133* (2013.01)

(58) Field of Classification Search
CPC .. G06F 21/31; G06F 21/36; G06F 2221/2133; G06F 2221/2103; G06F 2221/213; H04L 63/08
See application file for complete search history.

(56) References Cited

U.S. PATENT DOCUMENTS

| 8,621,396 | B1 * | 12/2013 | Gossweiler, III | G06F 3/0488 713/183 |
| 2010/0229223 | A1 * | 9/2010 | Shepard | G06F 21/31 726/5 |
| 2011/0029781 | A1 * | 2/2011 | Clark | G06F 21/31 713/182 |
| 2012/0195517 | A1 * | 8/2012 | Mittur | G06F 21/31 382/254 |
| 2015/0128236 | A1 * | 5/2015 | Moscicki | H04L 63/0876 726/7 |
| 2015/0365401 | A1 * | 12/2015 | Brown | H04L 63/0838 726/7 |

* cited by examiner

*Primary Examiner* — Theodore C Parsons
*Assistant Examiner* — Carlos M De Jesus Lassala
(74) *Attorney, Agent, or Firm* — Blank Rome LLP

(57) ABSTRACT

Techniques are disclosed for implementing a CAPTCHA access control system based on graphical representations of a watch or other timekeeping device. More particularly, the disclosed CAPTCHA system's request/challenge mechanism employs a graphical representation of a watch whose perturbation from a baseline visual presentation is controlled by a large number of attributes, each of which may assume a number of different values. The use of a large number of display attributes (e.g., 20 or more) and a relatively small number of difficulty levels allows each difficulty level to have an enormous number of possible graphical representation. Such a large number of potential challenge images essentially precludes the likelihood that any automated search for a matching image—providing the ability to correctly respond with certainty to the challenge query—will be successful.

24 Claims, 8 Drawing Sheets

300

| WATCH TYPE / ATTRIBUTE | CHRONOGRAPH | COLOR ANALOG | UTILITARIAN NUMBERS | UTILITARIAN PILLS |
|---|---|---|---|---|
| COMPLICATIONS | 4 | 5 | 4 | 5 |
| FACE VARIATIONS | 7 | 8 | 4 | 4 |
| TIME | 720 | 720 | 720 | 720 |
| LOCALE | 15 | 15 | 15 | 15 |
| ANGLE | 120 | 120 | 120 | 120 |
| DATE | 248 | 31 | 2635 | 248 |
| ALARM | 720 | 720 | 720 | 720 |
| TIMER | 720 | 720 | 720 | 720 |
| STOPWATCH | 1440 | 1440 | 1440 | 1440 |
| SUNRISE | 360 | 360 | 360 | 360 |
| SUNSET | 360 | 360 | 360 | 360 |
| MOON | 28 | 28 | 28 | 28 |
| WEATHER | 160 | 160 | 160 | 160 |
| MONOGRAM | --- | 17,576 | --- | --- |

FIG. 3

FACE FRONT (0° - REFERENCE ANGLE)

FACE ROTATED LEFT (30°)

FACE FRONT (0° - REFERENCE ANGLE)

FACE ROTATED LEFT (30°)

DYNAMIC WATCH-BASED CAPTCHA

BACKGROUND

The term CAPTCHA is an acronym for "Completely Automated Public Turing test to tell Computers and Humans Apart. CAPTCHA's are often used in challenge-response tests by computer systems to determine whether or not the test's responder is human. In practice, the "challenge" is presented as a distorted sequence of letters that a human may readily identify but which is very difficult for current computational systems to do so (e.g., artificial intelligence-based web applications). The "response" is compared to a known solution and, if correct, the responder is granted access to a specified computer resource (e.g., data).

One use of CAPTCHAs is to prevent automated programs ("bots") from accessing various types of computing resources or services. Illustrative uses include: prevention of comment spam in blogs; protection against automated email account registration and collection; prevention against the automated access and participation in online polls; prevention of automated dictionary attacks against password systems; prevention of automated search engine bots from indexing web pages; and the prevention of automated access to, and download of, data (e.g., from an online database).

Modern CAPTCHA systems are designed such that they require the simultaneous use of three separate abilities—invariant recognition, segmentation, and parsing. Invariant recognition refers to the ability to recognize a large amount of variation in the shapes of the presented symbols. While there can be a large number of versions for each symbol within a symbol-set that a human brain can successfully identify (e.g., letters and numbers), the same is not true for current computational systems, and teaching a computer system to recognize all the differing formations is extremely difficult. Segmentation, or the ability to separate one symbol from another, is also made difficult in CAPTCHAs by crowding together adjacent symbols so that no white space appears between them. Context is also critical. A good CAPTCHA must be understood holistically to correctly identify each symbol. For example, in one segment of a CAPTCHA, a symbol might look like an "m." Only when the whole sequence of symbols is taken into account does it become clear that it is two adjacent "n's." Even in isolation each of these problems pose a significant challenge to current computer technology.

SUMMARY

In one embodiment the disclosed concepts provide a method to control access to computer resources through a CAPTCHA challenge/response system. The method includes receiving, from a client computer system, a request for access to a computer resource. In response, a difficulty level may be determined and, based on that, an access challenge may be determined, where the access challenge includes a graphical representation of a watch or other timekeeping device (e.g., a sun dial) in accordance with values of a first plurality of complexities, wherein each complexity may correspond to a different one of a second plurality of attributes, each attribute having a specified range of values, and wherein the number of possible graphical representations of the time keeping device comprises a permutation of the first plurality of complexities and the specified range of values of the second plurality of attributes. Once the access challenge is known the method may continue by obtaining an answer that correctly satisfies the query (which may occur at the same time as determining the access challenge), sending the access challenge to the client computer system, receiving in reaction thereto, a response to the query and transmitting, to the client computer system, an authorization token for the computer resource when the response matches the answer. If the response to the query is wrong, another access challenge may be generated and sent—with this process repeating until a correct response is received or it is determined that the client computer system has exhausted is authorized number of attempts. When the latter happens the client computer system may be prevented from attempting to gain access to the resource for a specified time period. A computer executable program to implement this method may be stored in any media that is readable and executable by a computer system.

BRIEF DESCRIPTION OF THE DRAWINGS

FIG. 3 shows, in table form, a number of watch types and associated attributes in accordance with one embodiment.

DETAILED DESCRIPTION

Figure 1:
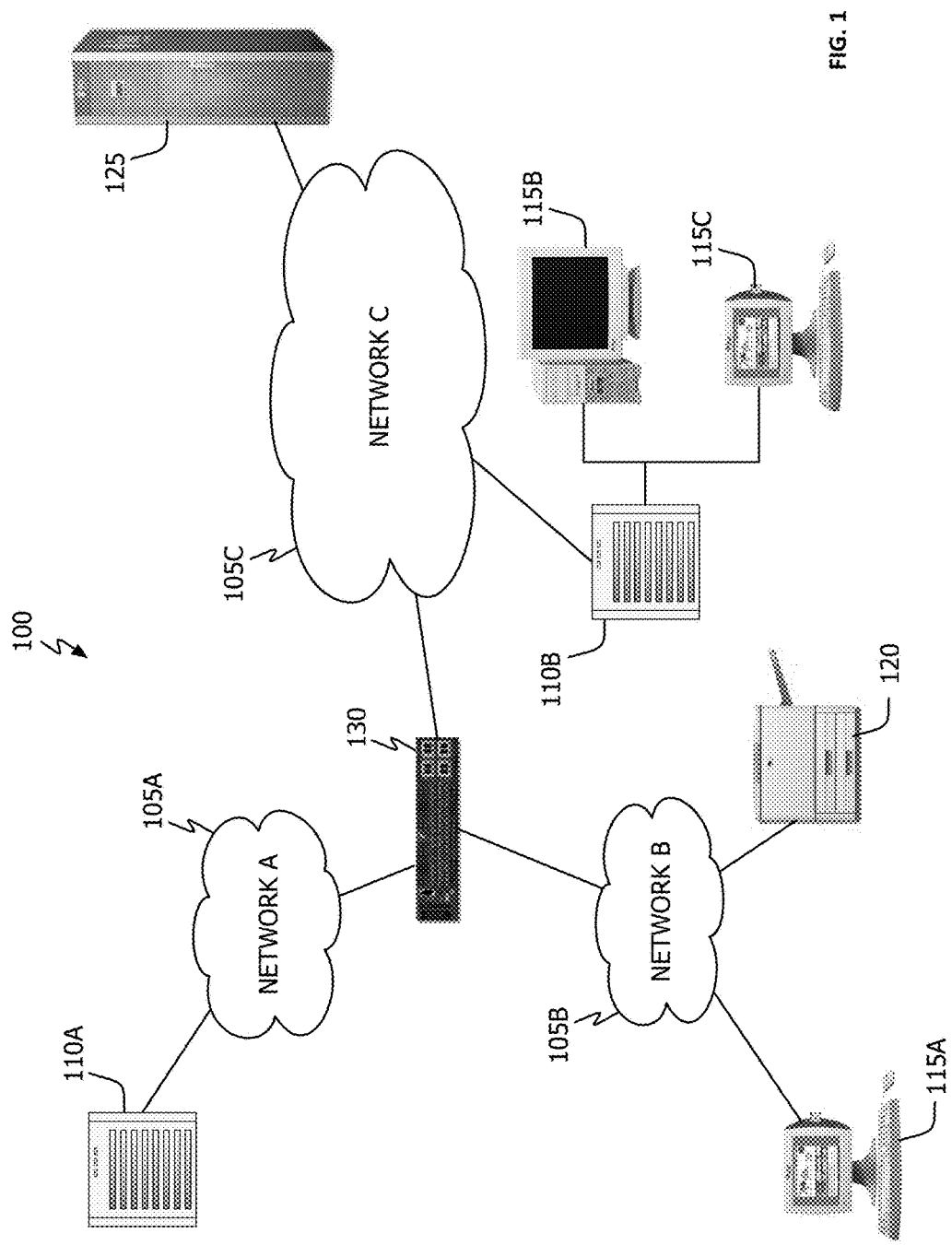
FIG. 1 shows, in block diagram form, a computer network in accordance with one embodiment.

This disclosure pertains to systems, methods, and computer readable media to improve the operation of CAPTCHA-based access systems. In general, techniques are disclosed for implementing a CAPTCHA access control system based on graphical representations of a timekeeping device (e.g., a sun dial) and, more particularly a watch (e.g., a watch face and band), and even more particularly to an analog watch. More specifically, the disclosed CAPTCHA system's request/challenge mechanism employs a graphical representation of a timekeeping device whose perturbation from a baseline visual presentation is controlled by a large number of attributes, each of which may assume a number of different values. Illustrative attributes include, but are not limited to, a rotation angle at which the watch is displayed, the type of watch depicted (e.g., a plain white background with or without hour ticks, and a visually busy background that partially obfuscates the watch's hour/minute hands and/or the displayed hour ticks), and the presence or absence of secondary visual elements that may, or may not, impact the challenge's associated query (e.g., elements indicative of temperature, phases of the moon and other information related to the function of, for example, a software application such as a stock ticker). The use of a large number of display attributes (e.g., 20 or more) and a relatively small number of difficulty levels (e.g., 10) allows each difficulty level to have an enormous number of possible images. Such a large number of potential challenge images essentially precludes the likelihood that any automated search for a matching image—providing the ability to correctly respond with certainty to the challenge query—will be successful.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics-based processing systems having the benefit of this disclosure.

Referring to FIG. 1, illustrative network architecture 100 within which a CAPTCHA system in accordance with the disclosed techniques may be implemented includes a plurality of networks 105, (i.e., 105A, 105B and 105C), each of which may take any form including, but not limited to, a local area network (LAN) or a wide area network (WAN) such as the Internet. Further, networks 105 may use any desired technology (wired, wireless or a combination thereof) and communication protocol (e.g., TCP, or transmission control protocol and PPP, or point to point). Coupled to networks 105 are data server computer systems 110 (i.e., 110A and 110B) that are capable of communicating over networks 105. Also coupled to networks 105, and/or data server computer systems 110, are client or end-user computer systems 115 (i.e., 115A, 115B and 115C). In some embodiments, network architecture 100 may also include network printers such as printer 120 and network storage systems such as 125. To facilitate communication between different network devices (e.g., server computer systems 110, client computer systems 115, network printer 120 and storage system 125), at least one gateway or router 130 may be optionally coupled there between. By way of example only, and for purposes of the following, consider the use-case in which client computer system 115C executes an application (e.g., a web browser) that requests access to a resource (e.g., a database) from a computer system that uses a CAPTCHA system in accordance with this disclosure executing on server computer system 110A (through local server computer system 110B, network C 105C, network router 130 and network A 105A).

Figure 2:
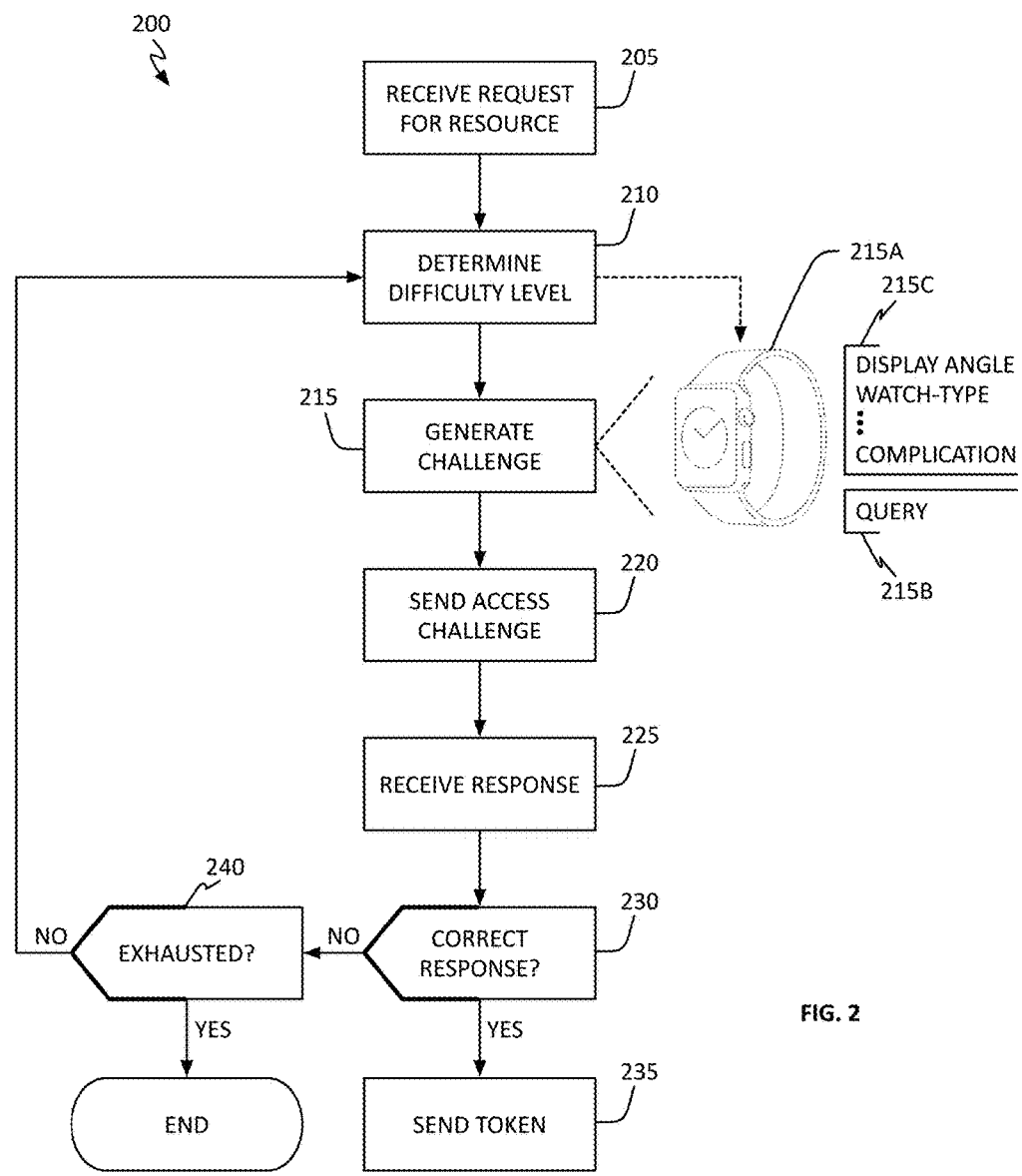
FIG. 2 shows, in flowchart form, a dynamic watch-based CAPTCHA operation in accordance with one embodiment.

Referring to FIG. 2, dynamic timekeeping device-based CAPTCHA operation 200 in accordance with one embodiment begins when a CAPTCHA service executing on server computer system (e.g., 110A) receives an access request (hereinafter, a "request") to a controlled resource from an application executing on client or end-user computer system such as client computer system 115C (block 205). From here forward, the discussion will recite only the server and client computer systems with it being understood that applications executing on these platforms are the functional entities making requests and responding thereto. Server computer system may then determine a difficulty level for the request's challenge (block 210). In one embodiment, all client applications seeking access to a specified resource may be assigned the same default difficulty level. In another embodiment, each different client application may be assigned a different default difficulty level. In yet another embodiment, the client computer system's apparent location (or specific network address) may be used to assign a default difficulty level. In still another embodiment, the time of day may be used to establish a default difficulty level. In another embodiment, the effective location of the light source that illuminates the watch face and/or the selected display angle may be changed to effect the difficulty (e.g., some locations and/or display angles may generate glare that makes reading the watch face more or less difficult). In another embodiment, combinations of the aforementioned approaches may be used to establish a default difficulty level.

Once the difficulty level is known, selected or calculated, the server computer system may generate a challenge (block 215). In one embodiment, a challenge may comprise watch-based challenge image 215A and query 215B, where query 215B represents a question about some visual aspect of challenge image 215A. The visual appearance of challenge image 215A can be controlled by the values assigned to each of a number of attributes 215C. Three illustrative attributes include display angle (the angle at which challenge image 215A is rotated with respect to a specified reference), watch-type (indicative of the type of watch—e.g., a watch face and watch band—chosen for challenge image 215A), and complication (corresponding generally to the visual complexity of challenge image 215A and, more specifically, to the number of attributes that may be displayed/changed at one time for the designated watch type). In one embodiment, generating a specific challenge image means selecting an image from a pre-rendered set of images, along with a corresponding query (e.g., from a library of previously rendered images). For example, if ten (10) difficulty levels are defined and a default difficulty level for a given request type is X, then one of the images that have been pre-designated as belonging to the difficulty level X may be selected. The selection method may be, for example, uniformly random, weighted random (to account for previously selected images), or sequential (with no repetition of a previously selected image). In another embodiment, the difficulty level and other characteristics of a request may be used to dynamically generate a challenge image and query. By way of example, identification of a challenge image may be expressed as:

$$\text{Challenge Image Identifier} = f(D, L, T, S), \text{ where} \qquad \text{EQ. 1}$$

"D" represents the desired difficulty level, "L" represents the requesting client's location (e.g., the southern United States), "T" represents the time of day, and "A" represents the requesting application's identity. In one embodiment, the challenge image identifier may be the image itself. In another embodiment the challenge image identifier may uniquely identify a pre-rendered image. Those of ordinary skill in the art will recognize any number of methods may be used to implement image selection in accordance with a function such as that in EQ. 1.

Returning to FIG. 2, the generated challenge may be sent to the requesting client (block 220), where after the client's response is received by the server computer system (block 225). If the response is correct (the "YES" prong of block 230), the server may return a token to the requested resource which the client may use to access the desired functionality (block 235). If the response is wrong (the "NO" prong of block 230), a further test may be made to determine if the client should be permitted to continue requesting the desired resource for some period of time—which may be short or long (block 240). By way of example, a client may be granted five (5) tries within a specified period of time before it has exhausted its current opportunity. In another embodiment, the number of attempts may be based on a number of factors such as the attempted difficulty level, the time of day and the estimated location of the client computer system. The precise number of attempts granted any give requesting client may be fixed (e.g., all clients executing X application receive Y attempts) or dynamic (if the difficulty level is X and the client's estimated location is Y, and the time of day is Z, the requesting client may be given W attempts). If the client has exhausted their allotment of attempts (the "YES" prong of block 240), the CAPTCHA session may be terminated. If, on the other hand, the client has not exhausted their number of attempts (the "NO" prong of block 240), processing continues at block 210. In one embodiment, the difficulty level may be increased each time a client gives a wrong answer. In another embodiment, the difficulty level may be decreased each time a client gives a wrong answer. In still another embodiment, the difficulty level may be kept constant but other factors about challenge image 215A may be altered.

Figure 4A:
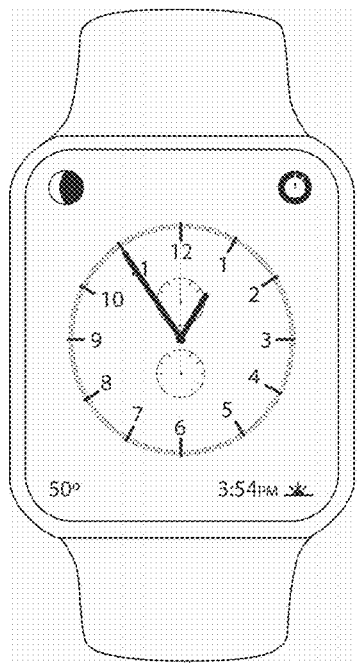
FIGS. 4A-4D shows four watch types in accordance with one embodiment.
Figure 4B:
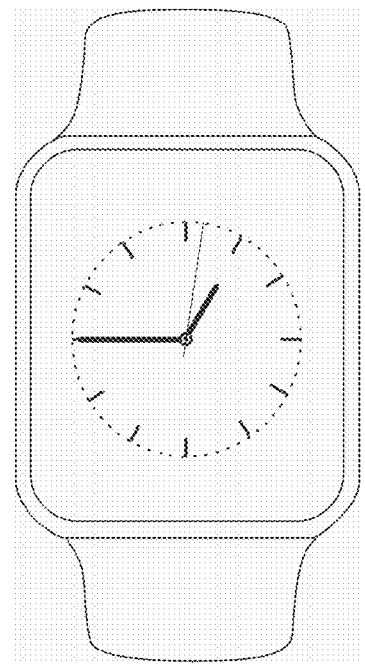
Figure 4C:
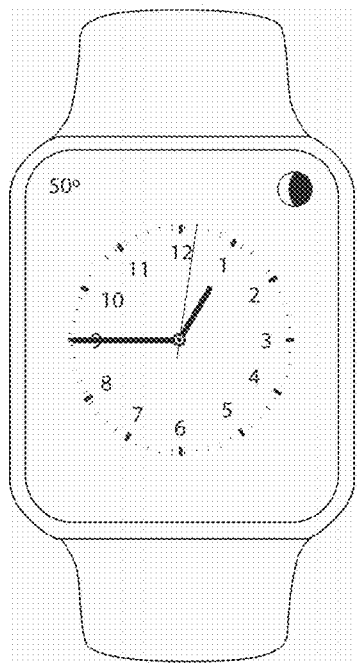
Figure 4D:
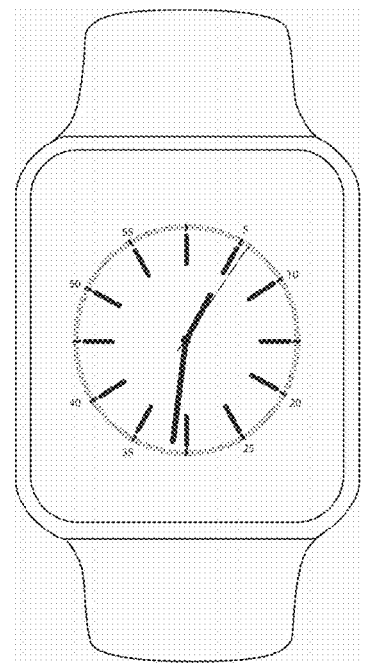
Figure 5A:
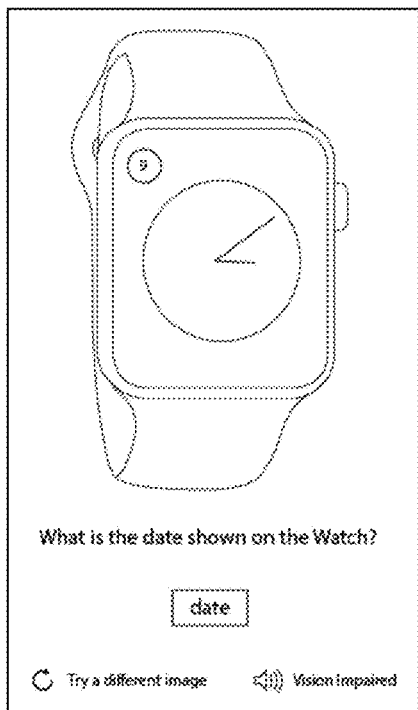
FIGS. 5A-5F illustrates a number of different challenge images for a given set of complications and their designated attribute values.
Figure 5B:
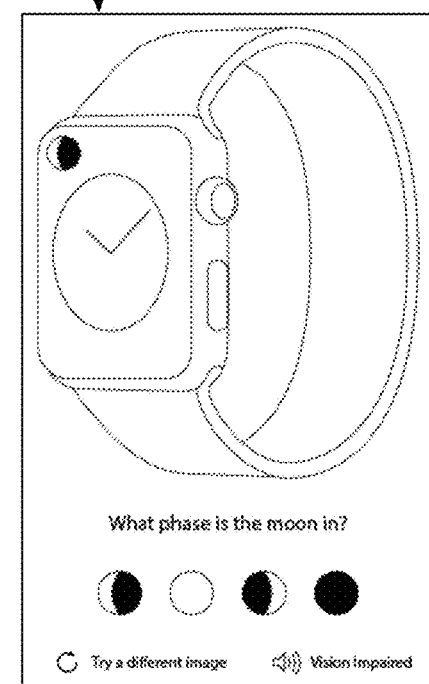
Figure 5C:
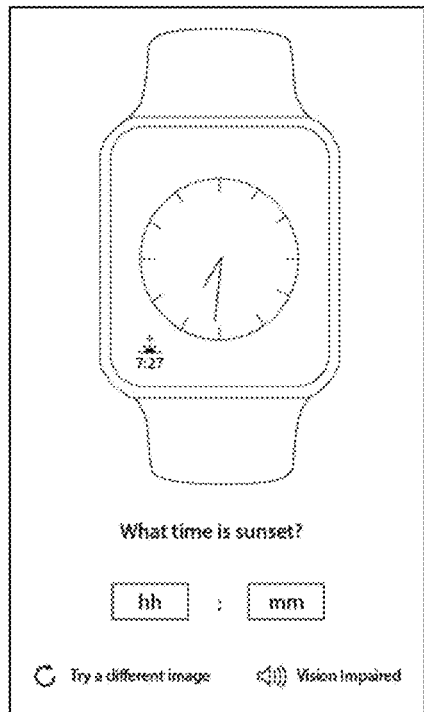
Figure 5D:
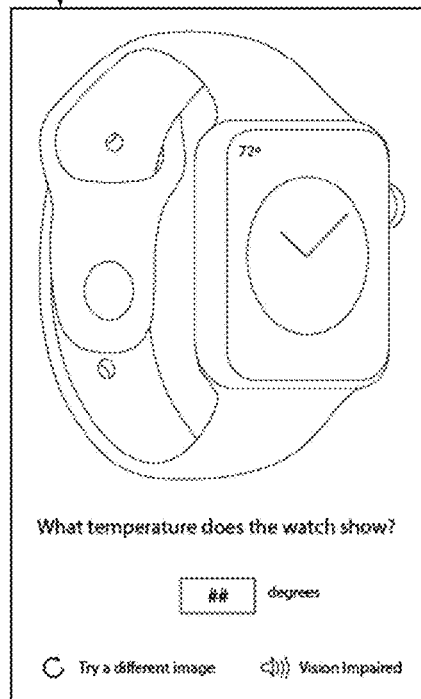
Figure 5E:
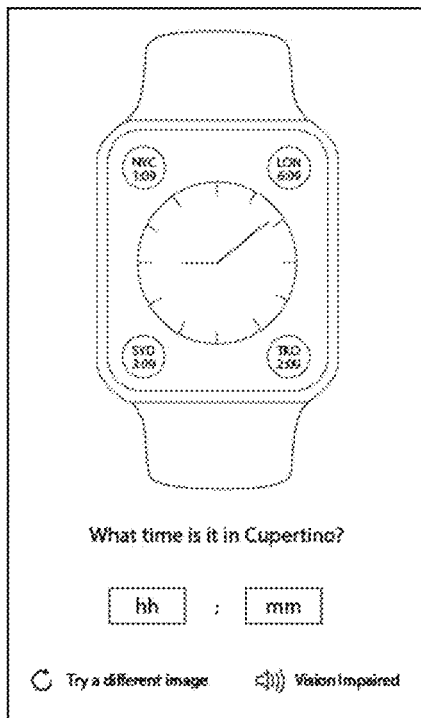
Figure 5F:
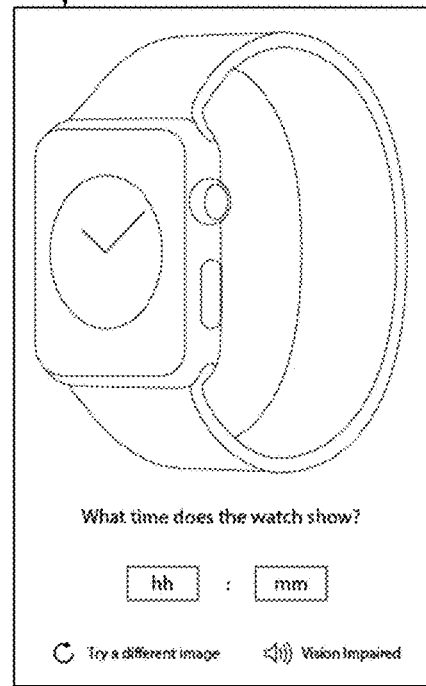

Referring to FIG. 3, for the case when the timekeeping device is a watch, an example challenge image attribute list 300 may include four (4) different watch types from which challenge image 215A may be chosen: chronograph (see FIG. 4A); color analog (see FIG. 4B); utilitarian numbers (see FIG. 4C); and Utilitarian pills (see FIG. 4D). As attribute list 300 shows, each watch type may have a number of different attributes (rows) and each attribute may take on a number of different values—example ranges identified by table entry values. For the example watch types shown in attribute list 300, a chronograph type watch may have 4 complications, a color analog watch type 5 complications, a utilitarian numbers watch type 4 complications, and a utilitarian pill watch type 5 complications. As used here, the term "complication" means the number of different attributes that may be displayed and changed at any given time. Similarly, a color analog watch type may have 8 different face variations while the utilitarian numbers and utilitarian pills watch types may only have 4. Table 1 provides, for the utilitarian pills watch type, an explanation for each attribute and its value given in example attribute list 300.

TABLE 1

Example Attributes for a Color Analog Watch Type

| Attribute | Value | Calculation |
|---|---|---|
| Face Variations | 8 | No. of different color variations (purple, yellow, blue, red, . . . ) that the color analog watch may exhibit |
| Time | 720 | No. of unique alarm times that may be displayed: (no. of display hours) × (minutes per hour) = 12 × 60 |
| Locale | 15 | No. of unique geographic locales that have different standard ways for displaying the date, currency, and the local language |
| Angle | 120 | No. of unique angles through which the challenge image may be rotated |
| Date | 31 | No. days per month |
| Alarm | 720 | No. of unique alarm times that may be displayed: (no. of display hours) × (minutes per hour) = 12 × 60 |

TABLE 1-continued

Example Attributes for a Color Analog Watch Type

| Attribute | Value | Calculation |
|---|---|---|
| Timer | 720 | No. unique timer values that may be displayed: (display hours) × (minutes per hours) = 12 × 60 |
| Stopwatch | 1,440 | No. of unique times the stopwatch function can display: (no. of display hours) × (minutes per hours) = 24 × 60 |
| Sunrise | 360 | No. of minutes in the 12-hour a.m. window sunrise could occur: (no. of display hours) × (minutes per hours) = 12 × 60 |
| Sunset | 360 | No. of minutes in the 12-hour p.m. window sunset could occur: (no. of display hours) × (minutes per hours) = 12 × 60 |
| Moon | 28 | No. of days between new moon-to-full moon-to-new moon |
| Weather | 160 | No. of unique degrees in a selected temperature range that may be displayed: (−40 F.) → (120 F.) |
| Monograms | 17,576 | No. of unique 3-letter monograms: (26) × (26) × (26) |

As illustrated by sample attribute list 300, the number of attributes (other than complications) is much greater than the number of complications (e.g., nearly 10:1 or greater). Further, the number of attributes, the number of values each of those attributes may assume, and the number of complications makes the total number of possible challenge images extremely large. As illustrated here, the number of possible challenge images is a permutation of the number of complications and the number of attributes. For example, if there are 'n' complications and 'N' attributes (where N>n), for a given selection of 'n' attributes the total number of possible challenge images may be given in one embodiment as:

$$\prod_{i=1}^{n} v_i,\qquad \text{EQ. 2}$$

where $v_i$ represents the number of possible values the $i^{th}$ selected attribute can assume. Note, EQ. 1 gives the number of possible challenge images for a given selection of 'n' attributes. The number of possible combinations of 'n' attributes from 'N' possible attributes is given by:

$$\binom{N}{n} = \frac{N!}{(N-n)! \times n!},\qquad \text{EQ. 3}$$

where x! represents x-factorial. Accordingly, the total number of possible challenge images that may be generated in accordance with this disclosure may be determined by identifying each of the number of possible combinations (given by EQ. 3) and for each such combination using EQ. 2 to identify the number of such images for that specific selection of attributes. Said differently, the total number of challenge images is the sum of an EQ. 3 number of applications of EQ. 2. The relationship expressed by EQ. 2 is that of a permutation and that of EQ. 3 a combination.

By way of example only, for the color analog watch type there are 5 complications (meaning each of 5 different attributes may be displayed/changed at any one time). If the selected attributes include stopwatch, display angle, face variations, moon and monograms, there are (1,440)×(120)×(8)×(28)×(17,576) or approximately 680 billion different possible challenge images for the specific chosen selection of 5 attributes. If there are a total of 13 attributes as identified in Table 1 above, there are another 1,286 different combinations of 5 attributes from the 13 possible (see EQ. 2) that must be accounted for when determining the total number of possible challenge images. The total number of challenge images in accordance with this disclosure becomes so large that an exhaustive (aka brute-force) approach to solving a CAPTCHA generated and displayed in accordance with this disclosure becomes very, very small. That is, it is believed virtually impossible to generate an exhaustive library of all possible capture images in accordance with this disclosure.

Referring to FIGS. 5A through 5F, a number of different watch CAPTCHA in accordance with this disclosure are presented to illustrate variations between different watch types or different assigned attributes for the same watch type. As shown in FIGS. 5A-5F some attributes may be displayed as secondary images such as, for example, date, moon phase, sunrise, sunset (not shown), a specified weather characteristic such as temperature, dew point (not shown), and the existence of rain or snow in the local area (not shown), and times in other regions of the world. In addition to the attributes identified in Table 1 and illustrated in FIGS. 5A-5F there could be multiple sizes of images—one for each client form factor. Because a mobile or cellular telephone has less display space than a notebook or tablet computer system, the number of different values some (or each) of the attributes may assume may vary from form factor-to-form factor. Another set of complications includes the use of images super-imposed on a chosen watch face. In accordance with this approach, a static image may be overlaid onto the displayed watch face (e.g., a multicolored brick wall). In accordance with another embodiment, but along these same lines, the image superimposed on the watch's face may be animated (e.g., a moving Mickey Mouse®). (MICKEY MOUSE is a registered trademark of Disney Enterprises, Incorporated.)

Figure 6:
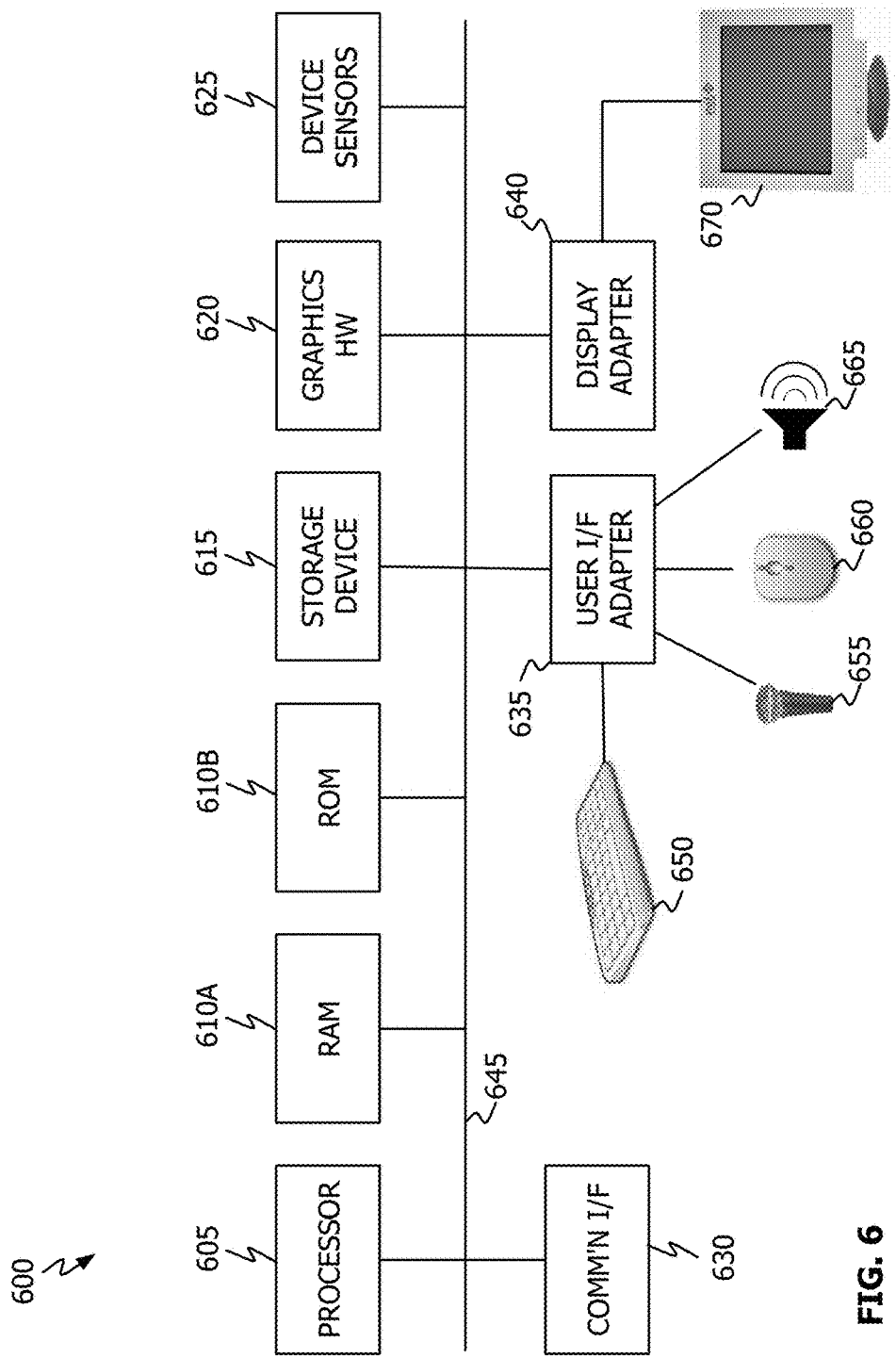
FIG. 6 shows, in block diagram form, a computer system in accordance with one embodiment.

Referring to FIG. 6, the disclosed embodiments may be performed by representative computer system 600 (e.g., a general purpose computer system or a server computer system). Computer system 600 may include one or more processors 605, memory 610 (610A and 610B), one or more storage devices 615, graphics hardware 620, device sensors 625 (e.g., proximity sensor/ambient light sensor, accelerometer and/or gyroscope), communication interface 630, user interface adapter 635 and display adapter 640—all of which may be coupled via system bus, backplane, or communication link 645. Memory 610 may include one or more different types of media (typically solid-state) used by processor 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions organized into one or more modules and written in any desired computer programming language, and any other suitable data. When executed by processor 605 and/or graphics hardware 620 such computer program code may implement one or more of the methods described herein. Communication interface 630 may be used to connect computer system 600 to one or more networks such as, for example, networks 105. User interface adapter 635 may be used to connect keyboard 650, microphone 655, pointer device 660, speaker 665 and other user interface devices such as a touch-pad and/or a touch screen (not shown). Display adapter 640 may be used to connect one or more display units 670.

Processor 605 may execute instructions necessary to carry out or control the operation of many functions performed by system 600 (e.g., such as communication with, for example, server computer systems 110). Processor 605 may, for instance, drive display 670 and receive user input from user interface 615. User interface 615 can take a variety of forms, such as a button, keypad, dial, a click wheel, keyboard, display screen and/or a touch screen. User interface 615 could, for example, be the conduit through which a user may respond to a challenge image in accordance with this disclosure. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs). In still other embodiments, computer system 600 could be a mobile device such as a mobile or cellular telephone, a personal media player or a digital camera.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, the disclosed challenge images (and their associated queries) may be generated dynamically or pre-rendered and stored in a manner readily accessible to the CAPTCHA server computer system. Further, FIG. 2 shows a flowchart illustrating a watch-based CAPTCHA operation in accordance with the disclosed embodiments. In one or more embodiments, one or more of the disclosed steps may be omitted, repeated, and/or performed in a different order than that described herein. Accordingly, the specific arrangement of steps or actions shown in FIG. 2 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An access control method, comprising:
   receiving, from a client computer system, a request for access to a computer resource;
   determining a difficulty level for the request;
   determining a time keeping device type based on the difficulty level;
   selecting, based on the difficulty level and the time keeping device type, a complication value from a plurality of complication values, wherein each complication value indicates a set of manipulatable attributes of the time keeping device type and corresponding manipulations for each attribute; and generating an access challenge based on the time keeping device type and the complication value, the access challenge comprising—
- a graphical representation of the time keeping device type having the set of manipulatable attributes and corresponding manipulations for each attribute determined from the complication value, and
- a query regarding an aspect of the graphical representation;

obtaining an answer that correctly satisfies the query;

sending, to the client computer system, the access challenge;

receiving, from the client computer system and in response to the access challenge, a response to the query; and transmitting, to the client computer system, an authorization token for the computer resource when the response matches the answer.

2. The method of claim 1, further comprising:

determining, when the response does not match the answer, a revised difficulty level for the request;

generating a revised access challenge based on the revised difficulty level, the revised access challenge comprising—
- a revised graphical representation of a revised time keeping device having a plurality of second attributes and a second complication value, the second complication value determining a second set of manipulatable attributes and corresponding manipulations for each attribute displayed and changed in the revised graphical representation; and
- a revised query regarding an aspect of the time keeping device type's graphical representation;

obtaining a revised answer that correctly satisfies the revised query;

sending, to the client computer system, the revised access challenge;

receiving, from the client computer system and in response to the revised access challenge, a revised response to the revised query; and transmitting, to the client computer system, the authorization token for the computer resource when the revised response matches the revised answer.

3. The method of claim 1, wherein the attributes include an angle of display attribute that is indicative of a total number of discrete angles to rotate the graphical representation of the time keeping device type.

4. The method of claim 1, wherein one of the attributes includes a secondary image that is displayed on the graphical representation of the time keeping device type.

5. The method of claim 4, wherein the secondary image includes a superimposed animated image.

6. The method of claim 1, wherein the graphical representation is one of a number of possible graphical representations of the time keeping device, and wherein the number of possible graphical representations is based on the complication value and values assigned to each of the attributes.

7. The method of claim 1, wherein generating an access challenge comprises selecting the graphical representation of the time keeping device type from a database based on the complication value and time keeping device type.

8. The method of claim 1, wherein at least some of the attributes are displayed via a secondary image on the graphical representation of the time keeping device type.

9. A computer system, comprising:
communication interface;
memory communicatively coupled to the communication interface;
one or more processors communicatively coupled to the communication interface and the memory, and configured to execute program code to:
- receive, from a client computer system through the communication interface, a request for access to a computer resource;
- determine a difficulty level for the request;
- determine a time keeping device type based on the difficulty level;
- selecting, based on the difficulty level and the time keeping device type, a complication value from a plurality of complication values, wherein each complication value indicates a set of manipulatable attributes of the time keeping device type and corresponding manipulations for each attribute; and
- generate an access challenge based on the time keeping device type and the complication value, the access challenge comprising—
  - a graphical representation of the time keeping device type having the set of manipulatable attributes and corresponding manipulations for each attribute determined from the complication value, and
  - a query regarding an aspect of the graphical representation;
- obtain an answer that correctly satisfies the query;
- send, to the client computer system through the communication interface, the access challenge;
- receive, from the client computer system through the communication interface and in response to the access challenge, a response to the query; and
- transmit, to the client computer system through the communication interface, an authorization token for the computer resource when the response matches the answer.

10. The computer system of claim 9, wherein the program code further comprises program code to cause the one or more processors to:

determine, when the response does not match the answer, a revised difficulty level for the request;

generate a revised access challenge based on the revised difficulty level, the revised access challenge comprising—
- a revised graphical representation of a revised time keeping device having a plurality of second attributes and a second complication value, the second complication value determining a second set of manipulatable attributes and corresponding manipulations for each attribute displayed and changed in the revised graphical representation; and
- a revised query regarding an aspect of the time keeping device's graphical representation;

obtain a revised answer that correctly satisfies the revised query;

send, to the client computer system through the communication interface, the revised access challenge;

receive, from the client computer system through the communication interface and in response to the revised access challenge, a revised response to the revised query; and transmit, to the client computer system through the communication interface, the authorization token for the computer resource when the revised response matches the revised answer.

11. The computer system of claim 9, wherein the attributes include an angle of display attribute that is indicative of a total number of discrete angles to rotate the graphical representation of the time keeping device type.

12. The computer system of claim 9, wherein one of the attributes includes a secondary image displayed on the graphical representation of the time keeping device type.

13. The computer system of claim 12, wherein the secondary image includes a superimposed animated image.

14. The computer system of claim 9, wherein the complication value sets the number of manipulatable attributes in the set of manipulatable attributes to at least four.

15. The computer system of claim 9, wherein the program code to generate an access challenge comprises program code to select the graphical representation of the time keeping device type from a database based on the complication value and the time keeping device type.

16. The computer system of claim 9, wherein the graphical representation is one of a number of possible graphical representations of the time keeping device type, and wherein the number of possible graphical representations is based on the complication value and values assigned to each of the attributes.

17. A non-transitory program storage device comprising instructions stored thereon to cause one or more processors to:
receive, from a client computer system, a request for access to a computer resource;
determine a difficulty level for the request;
determine a time keeping device type based on the difficulty level;
selecting, based on the difficulty level and the time keeping device type, a complication value from a plurality of complication values, wherein each complication value indicates a set of manipulatable attributes of the time keeping device type and corresponding manipulations for each attribute; and
generate an access challenge based on the time keeping device type and the complication value, the access challenge comprising—
a graphical representation of the time keeping device type having the set of manipulatable attributes and corresponding manipulations for each attribute determined from the complication value, and
a query regarding an aspect of the graphical representation;
obtain an answer that correctly satisfies the query;
send, to the client computer system, the access challenge;
receive, from the client computer system and in response to the access challenge, a response to the query; and
transmit, to the client computer system, an authorization token for the computer resource when the response matches the answer.

18. The non-transitory program storage device of claim 17, further comprising instructions stored thereon to cause the one or more processors to:
determine, when the request does not answer the response, a revised difficulty level;
generate a revised access challenge based on the revised difficulty level, the revised access challenge comprising—
a revised graphical representation of a revised time keeping device having a plurality of second attributes and a second complication value, the second complication value determining a second set of manipulatable attributes and corresponding manipulations for each attribute displayed and changed in the revised graphical representation; and
a revised query regarding an aspect of the time keeping device type's graphical representation;
obtain, from the client computer system, a revised answer that correctly satisfies the revised query;
send, to the client computer system, the revised access challenge;
receive, from the client computer system and in response to the revised access challenge, a revised response to the revised query; and
transmit, to the client computer system, the authorization token for the computer resource when the revised response matches the revised answer.

19. The non-transitory program storage device of claim 17, wherein the attributes include an angle of display attribute that is indicative of a total number of discrete angles to rotate the graphical representation of the time keeping device type.

20. The non-transitory program storage device of claim 17, wherein one of the attributes includes a watch face with a secondary image displayed on the graphical representation of the time keeping device type.

21. The non-transitory program storage device of claim 20, wherein the secondary image includes a superimposed animated image.

22. The non-transitory program storage device of claim 17, wherein the complication value sets the number of manipulatable attributes of the set of manipulatable attributes to at least four.

23. The non-transitory program storage device of claim 17, wherein the instructions to cause the one or more processors to generate an access challenge comprise instructions to cause the one or more processors to select the graphical representation of the time keeping device type from a database based on the complication value and the time keeping device type.

24. The non-transitory program storage device of claim 17, wherein at least some of the attributes are displayed via a secondary image on the graphical representation of the time keeping device type.

* * * * *